Figure 1:
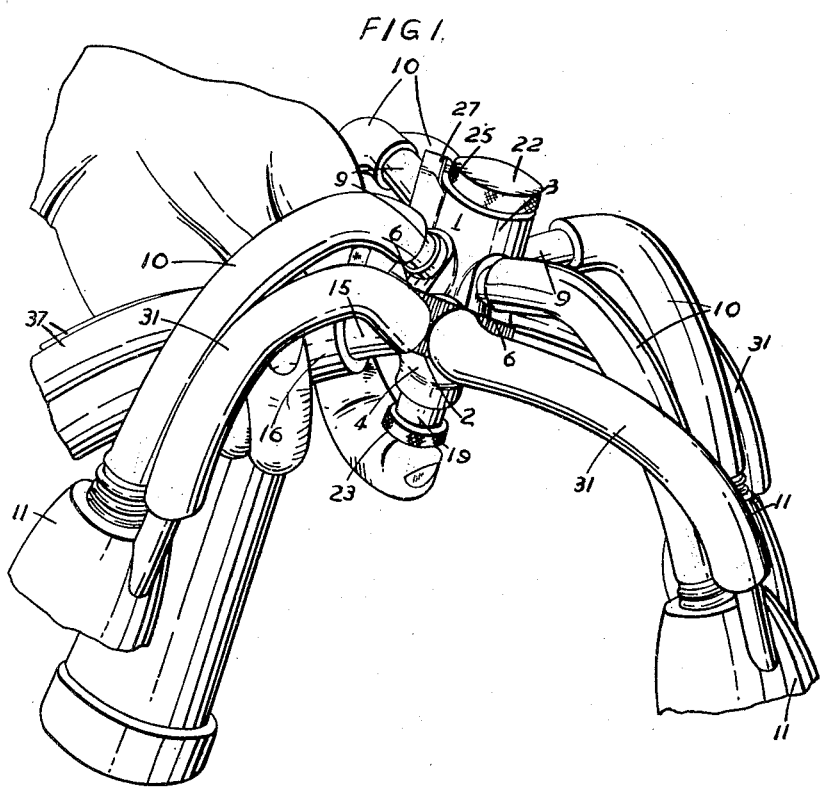

May 16, 1950     G. H. GASCOIGNE     2,507,969
CLAW FOR MILKING MACHINES

Filed Jan. 24, 1949     5 Sheets-Sheet 1

Inventor
G. H. Gascoigne
By
E. F. Wenderoth
Attorney

May 16, 1950  G. H. GASCOIGNE  2,507,969
CLAW FOR MILKING MACHINES
Filed Jan. 24, 1949  5 Sheets-Sheet 2
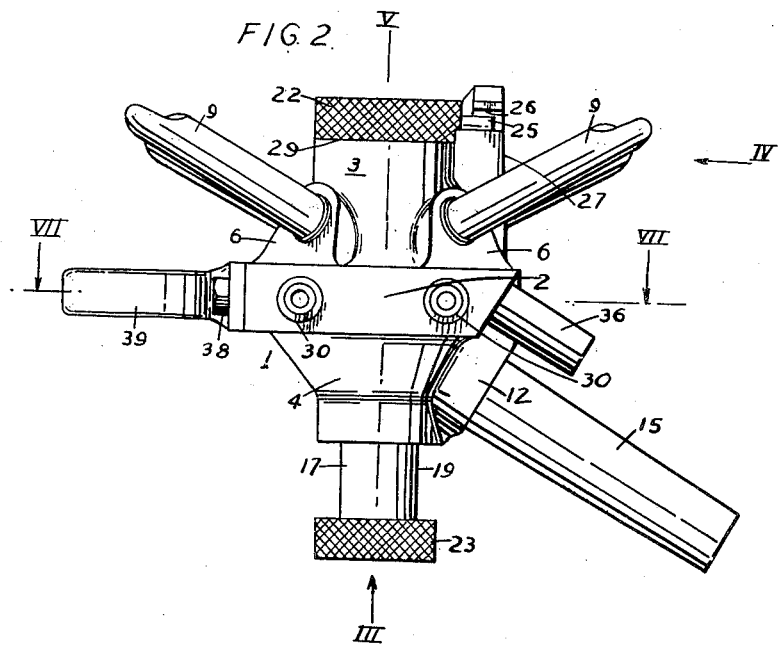
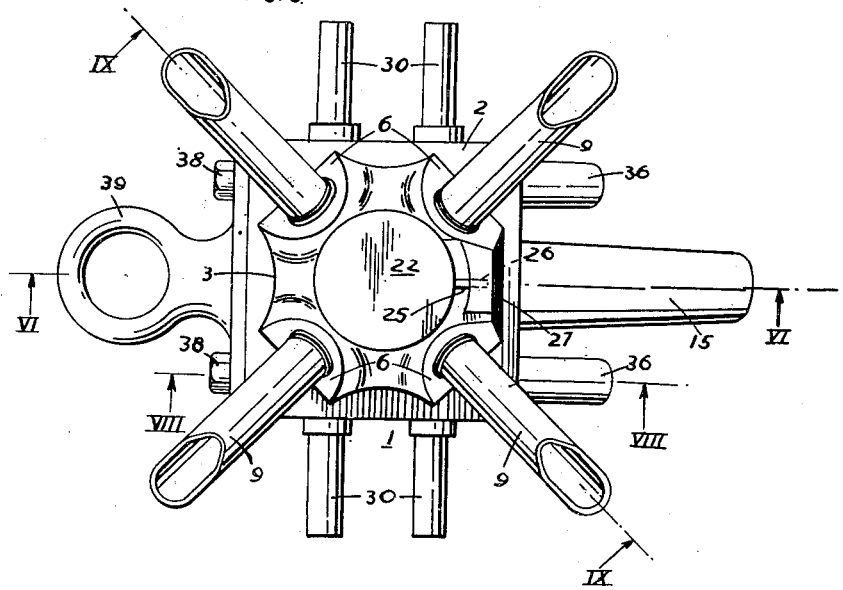
Inventor
G. H. Gascoigne
By
E. F. Wenderoth
Attorney May 16, 1950 G. H. GASCOIGNE 2,507,969
CLAW FOR MILKING MACHINES Filed Jan. 24, 1949 5 Sheets-Sheet 3

Inventor
G. H. Gascoigne
By
C. F. Wenderoth
Attorney

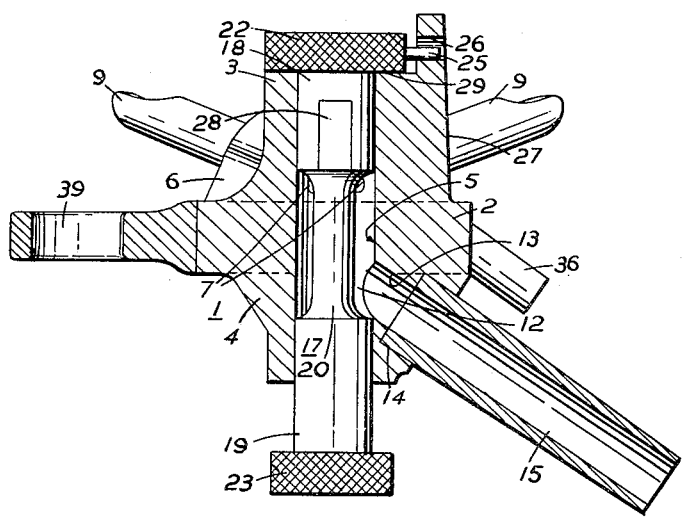
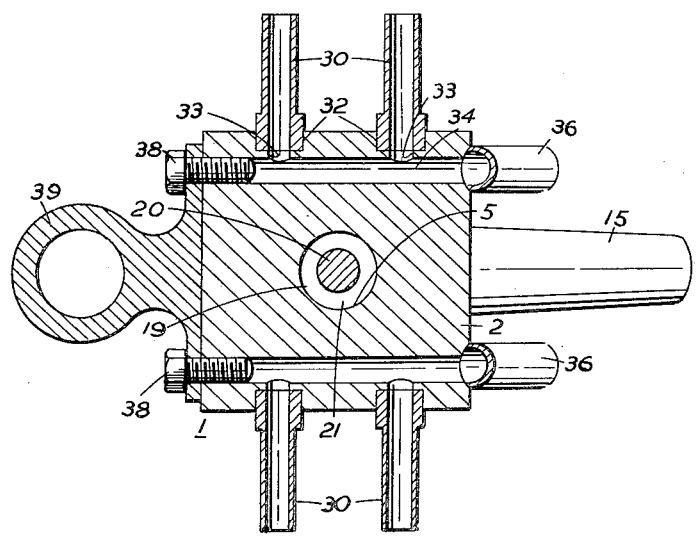

May 16, 1950  G. H. GASCOIGNE  2,507,969
CLAW FOR MILKING MACHINES
Filed Jan. 24, 1949  5 Sheets-Sheet 5

Inventor
G. H. Gascoigne
By
E. F. Wenderoth
Attorney

Patented May 16, 1950

2,507,969

UNITED STATES PATENT OFFICE 2,507,969

CLAW FOR MILKING MACHINES

George H. Gascoigne, Wokingham, England, assignor to Gascoignes (Reading) Ltd., Reading, Berkshire, England, a British company Application January 24, 1949, Serial No. 72,375
In Great Britain January 16, 1948

3 Claims. (Cl. 31—83)

This invention relates to vacuum-operated milking machines and has particular reference to a device commonly known as a claw, which is used in association with a so-called teat cup cluster, said claw constituting a means whereby the teat cups of the cluster are brought together to unite the milk drawn from the teats of the cow's udder into a common stream which passes under hygienic conditions to a closed pail or to some other collecting point and also a means whereby a source of pneumatic suction or negative pressure can be applied in appropriate sequence from a pulsating motor to said teat cups in well known manner.

It is an object of the present invention to provide an improved claw for use with milking machine which possesses several features of advantage hitherto not obtained, these advantages being due to the provision made by and in the improved claw of means for arresting the flow of milk therethrough and for changing the conditions of positive and negative pressure prevailing in the associated teat cup cluster. In other words, the improved claw by a simple manual operation permits of instant shut off of the flow of milk through the claw followed by the admission of air to the teat cups to nullify the effects of the suction applied thereto, said operation being effected as close as possible to the cow's udder, that is, at the point where the teat cups of the cluster meet together.

One of the advantages gained is that the simple manual operation which is effected at the claw provides for gentle release of the teats from the teat cups. The claw is adapted to be held in one hand when the suction shut off operation is effected and the same hand may be used to effect the operation. The operation results instantly in the cutting off of the suction applied inside the rubber liners and also the admission of air to the milk conveying passages of the claws and asociated tubes leading to the interiors of the liners of the teat cups, so that all teat cups of the cluster attached to the claw become detached from the teats without exerting pull on the udder which avoids any possibility of damaging the delicate udder tissue.

Another advantage is gained by virtue of the improved claw, namely, in the event of the teat cup cluster dropping off from the cow's teats accidentally it is found that the shut-off action which is intended normally to be performed manually is effected automatically. This is achieved in practice by arranging for the manually-operable control element to be so disposed that in practically every case this control element will touch the floor before the remainder of the claw and thus become displaced from the operating position to the shut-off position, with the result that the vacuum is instantly shut off thereby preventing both the loss of vacuum and the drawing into the system of foreign matter from the floor.

The improved claw according to the invention possesses another important advantage. It is customary when milking cows to dip the teat cups into a disinfectant solution between cow and cow to prevent the spread of udder diseases. With existing claws which embody no means for admitting air to the teat cups air locks will form in the teat cups and during the dipping operation the result will be that the disinfecting solution does not rise into the interiors of the teat cups. Our improved claw, however, serves to vent the teat cups when the suction shut-off operation is manually performed, thereby preventing these air locks.

With a view to achieving the above named objects the present invention provides a claw for the teat cup cluster of a milking machine, said claw being characterised by embodying in its construction a means whereby the flow of milk from the claw is shut off and the teat cups connected to said claw are vented to nullify vacuum created inside the teat cup liners, both as the result of a single operation. In a preferred arrangement the improved claw comprises a claw body, parts on the claw body to facilitate connection with the teat cup cluster associated with the claw to receive milk from the interiors of the teat cup liners and with a milk collecting pail or the like and an exteriorly operable valve member movably mounted therein, said valve being displaceable to shut off the connection with said milk collecting pail or the like and to vent the connections to the interiors of the teat cup liners. The valve member is conveniently in the form of an axially displaceable piston valve normally intended for manual operation but arranged so that the valve is almost certain to be displaced if the claw drops on the ground.

Figure 3:
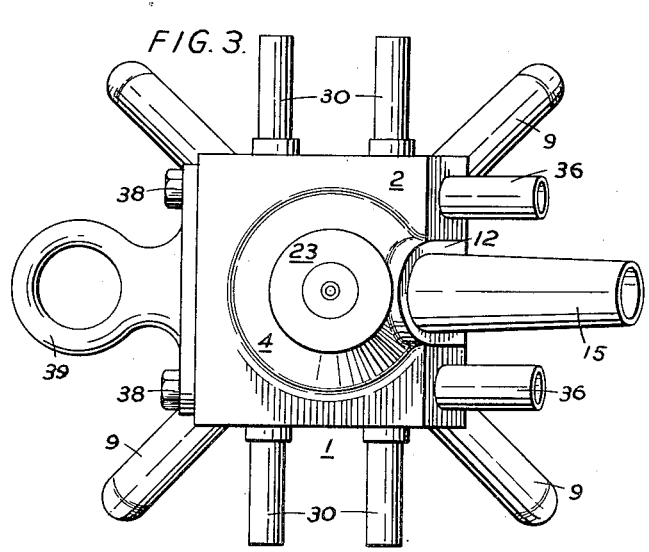
Figure 4:
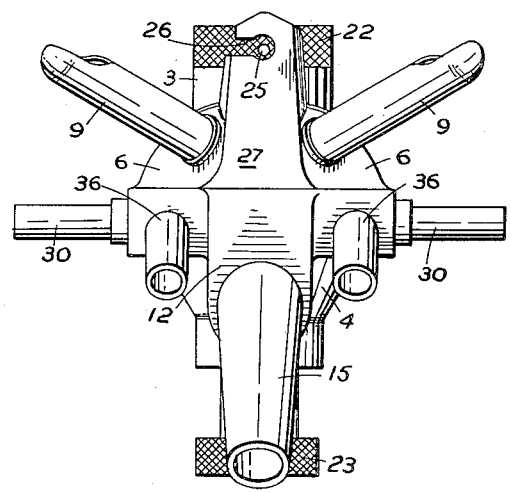
Figure 8:
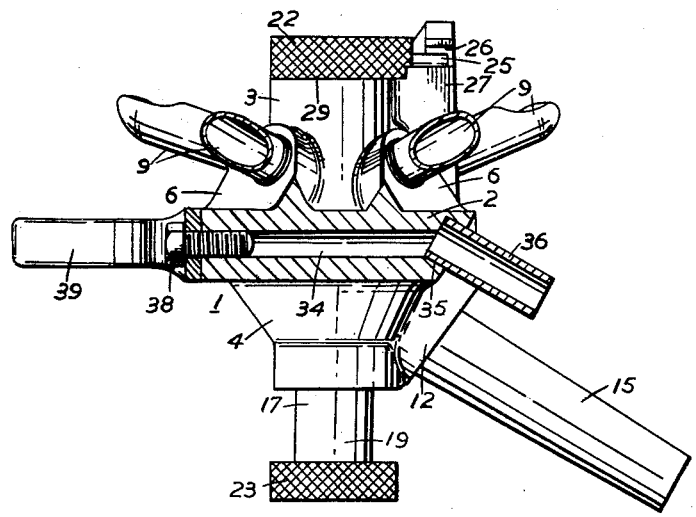
Figure 9:
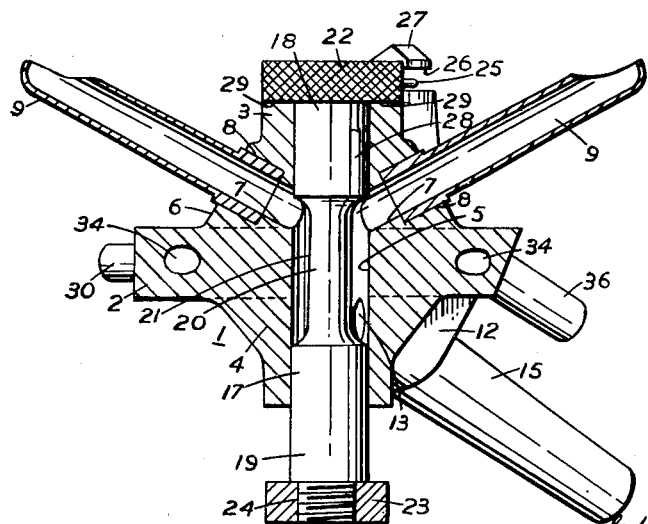

In order that the invention may be more readily understood an embodiment of the invention will now be described by way of example with the aid of the accompanying drawings, wherein:

Figure 1 is a pictorial view illustrating how the claw may be supported and operated by one hand, Figure 2 is a front elevation of the claw, Figure 3 is an inverted plan, viewed in the direction of arrow III, Figure 2, Figure 4 is a side elevation, viewed in the direction of arrow V, Figure 2, Figure 5 is a top plan, viewed in the direction of arrow V, Figure 2, Figure 6 is a sectional elevation on line VI, VI of Figure 5, Figure 7 is a sectional plan on line VII, VII of Figure 2, Figure 8 is a part sectional front elevation, the section being taken on line VIII, VIII of Figure 5, and Figure 9 is a diagonal vertical cross section on line IX, IX of Figure 5.

Referring first to Figures 2 to 9 inclusive of the drawings it will readily be understood that in the embodiment illustrated the improved claw comprises a main body 1 consisting of a flat substantially square medial plate portion 2 having integral therewith an upper substantially parallel-wall cylindrical portion 3 and an axially aligned lower substantially tapering cylindrical portion 4, the body 1 being provided with a through bore 5 of constant diameter.

The upper cylindrical portion 3 is furnished with four equiangularly disposed inclined-faced bosses 6 which are each pierced with an oblique counterbored passage 7 which opens into the upper part of the bore 5. Within the counterbore 8 of each said passage 7 is received the enlarged end of a tube 9 which is adapted to be connected by a flexible pipe 10 (see Figure 1) to the interior of the rubber lining of a teat cup 11. The outer end of each tube 9 is rounded and cutaway to facilitate slip-on engagement with the flexible pipe 10. The pipes 9 constitute the means whereby milk gathered in the teat cups 11 are brought into the claw. The lower cylindrical portion 4 of the claw body 1 is furnished with an inclined-faced boss 12 which is pierced with an oblique counterbored passage 13 which opens into the lower part of the bore 5. Within the counterbore 14 of the passage 13 is received the large end of a tube 15 which is adapted to be connected by a flexible pipe 16 (see Figure 1) to a milk collecting pail or the like (not shown). The tubes 9 and 15 are sweated or otherwise secured firmly within the counterbores 8 and 14 respectively. The milk which enters the claw through the inlet pipes 9 is adapted to pass through the bore 5 of the claw body 1 and out through the outlet pipe 15 to the milk collecting pail or the like.

Within the bore 5 of the claw body 1 is slidably mounted a piston valve 17 which comprises upper and lower snug fitting cylindrical shank portions 18 and 19 respectively separated by a reduced diameter stem 20 which provides an annular space 21 through which milk can flow between the four inlet passages 7 and the single outlet passage 13 when the valve 17 is in the position shown in the drawings. The valve 17 is provided with upper and lower knurled end discs 22, 23 respectively, at least one of which, for example disc 23 (see Figure 9) is made as a separate part subsequently attached to a screw threaded spigot 24 on the lower shank portion 19 to permit of insertion of the valve shank and stem within the body bore 5. The upper disc 22 may also be made as a separate part for convenience and economy in production but this optional feature is not illustrated. The disc 22 is provided with a laterally projecting pin 25 which is adapted to engage slackly within a notch 26 cut in the side of a lug 27 cast integral with the body portions 3. When the valve pin 25 is thus engaged in the body notch 26 the valve 17 is held in the open position illustrated in the drawings against accidental displacement. The valve 17 may readily be partially rotated to disengage the pin 25 thereof from the body notch 26 and thus permit of endwise displacement of the valve 17 by pressure on the bottom thereof so as to cause the lower shank portion 19 of the valve 17 to obturate the entrance to the milk outlet passage 13. The upper shank portion 18 of the valve 17 is provided with a flat 28 or similar reduction in or recessing of the shank portion 18, said flat 28 being so arranged that after the lower shank portion 19 has, by endwise bodily displacement of the valve 17, obturated the passage 13 the upper end of the flat 28 rises about the top face 29 of the claw body 1 and establishes direct communication between atmosphere and the interior of the body bore 5. In this manner the interiors of the teat cups 11 which are connected by pipes 10 to the tubes 9 associated with inlet passages 7 are vented and the formation of air locks prevented.

The claw serves also as a convenient means of applying suction to the teat cups 11 by providing four nozzles 30 which are connected by flexible pipes 31 to the spaces provided between the outer rigid shells of said teat cups 11 and the rubber linings (see Figure 1). The nozzles 30 are arranged in pairs, two on each of two opposite sides of the claw body 1 and are each sweated or otherwise secured within the counterbore 32 of a passage 33, two of said passages 33 opening into a cross drilling 34 provided in the medial plate portion 2 of the claw body 1 on one side of the bore 5 and the other two passages 33 opening into a similar drilling 34 disposed on the opposite side of the bore 5. One end of each cross drilling 34 opens into a socket 35 having its axis inclined to the drilling 34 and adapted to receive one end of a suction tube 36. The two suction tubes 36 are adapted to be connected by flexible pipes 37 (see Figure 1) to a pulsating motor (not shown) of known form whereby as the result of automatic change-over of connections pneumatic pulsations are applied to the rubber linings of the teat cups 11 via the flexible pipes 31, nozzles 30, passages 33, cross drillings 34, suction tubes 36 and pipe 37.

The other ends of the cross drillings 34 are tapped to receive screw studs 38 which secure to the claw body 1 an eye bracket 39 adapted to engage a hook or the like (provided for convenience on the associated milk collecting pail) upon which the claw is suspended when not in use.

The mode of operation of the claw will have been generally understood from the foregoing description. Figure 1 shows clearly how the claw may be held in one hand the valve 17 partially rotated to disengage its pin 25 from body notch 26 and displaced axially in order to shut off the milk outlet passage 13 and then vent the body bore 5 via the flat 28 on the upper shank portion 18 of the valve 17.

I claim:

1. A claw of the kind specified for the teat cup cluster of a milking machine, comprising a body having a through bore and a plurality of radiating tubes leading to a corresponding number of milk passages in said body, one of which serves to connect a milk receptacle to said through bore and the others of which serve to connect the interiors of the teat cup liners to said through bore, and a piston valve axially and rotatably displaceable in said through bore, said valve being made of a material which is unaffected by milk and having enlarged ends to limit its movement through said valve body and having a rigid shank consisting of cylindrical end portions snugly slidable in said through bore of the body and of a central stem of reduced diameter providing an annular space which when the piston valve is at one end of its stroke establishes communication for free flow of milk between the passages associated with the teat cup liners and the passage leading to the milk receptacle, and said valve having part of the length of one end portion thereof reduced in girth so that when the piston valve is moved to the other end of its stroke it first cuts off the flow of milk between the milk receptacle and the interiors of the teat cup liners and then brings the reduced part of said one end portion of the piston valve shank into a position where air from atmosphere is admitted between said reduced part and one open end of the through bore of the valve to vent the interiors of the teat cup liners.

2. A milking machine claw as claimed in claim 1, wherein one enlarged end of the piston valve has a lateral projection and the exterior of the body is fashioned with a notch to receive said lateral projection when the valve is partially rotated, for the purpose of temporarily retaining the piston valve at one end of its stroke.

3. A milking machine claw as claimed in claim 1, wherein the valve body has an enlarged portion in the form of a flat, substantially square plate approximately midway along the length of said body, said plate portion having tubes extending from opposite sides thereof leading to a pair of passages in said plate portion whereby to connect the teat cups with a source of pulsating pneumatic pressure and the last-named said passages being arranged one on each side of the bore of the valve body and perpendicular thereto.

GEORGE H. GASCOIGNE.

REFERENCES CITED

The following references are of record in the file of this patent:

FOREIGN PATENTS

| Number | Country | Date |
|---|---|---|
| 557,996 | Great Britain | Dec. 14, 1943 |
| 563,390 | Great Britain | Aug. 11, 1944 |